(No Model.) 2 Sheets—Sheet 1.

T. H. LINAHAN.
CASKET.

No. 606,466. Patented June 28, 1898.

Witnesses.
J. H. Shumins
Ellen Scarborough

Thomas H. Linahan
Inventor
By atty Earle Seymour (No Model.) 2 Sheets—Sheet 2.
T. H. LINAHAN.
CASKET.
No. 606,466. Patented June 28, 1898.
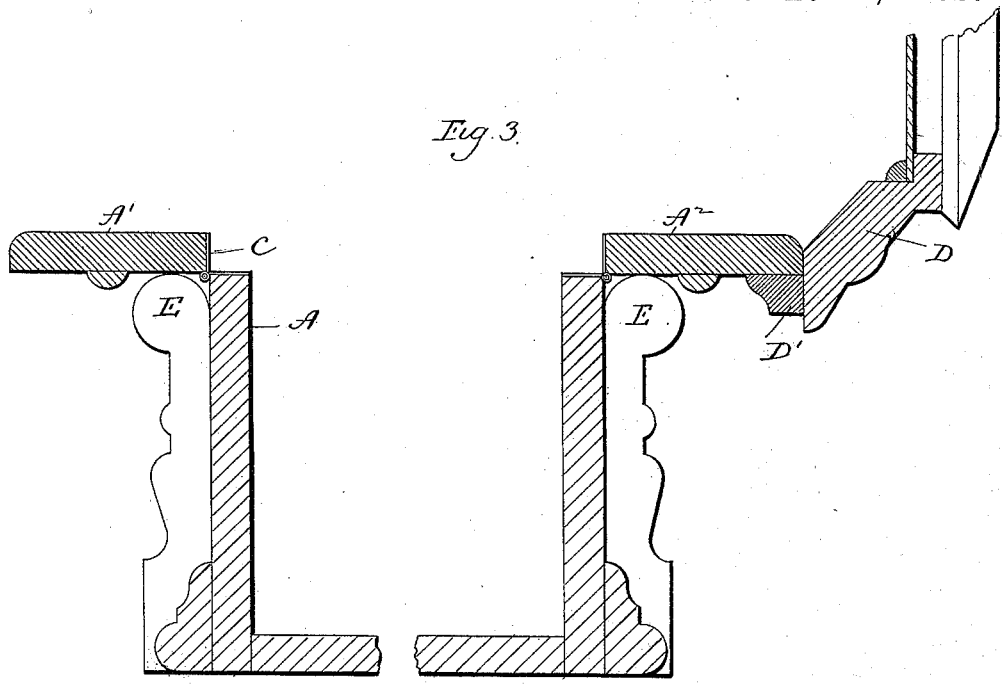
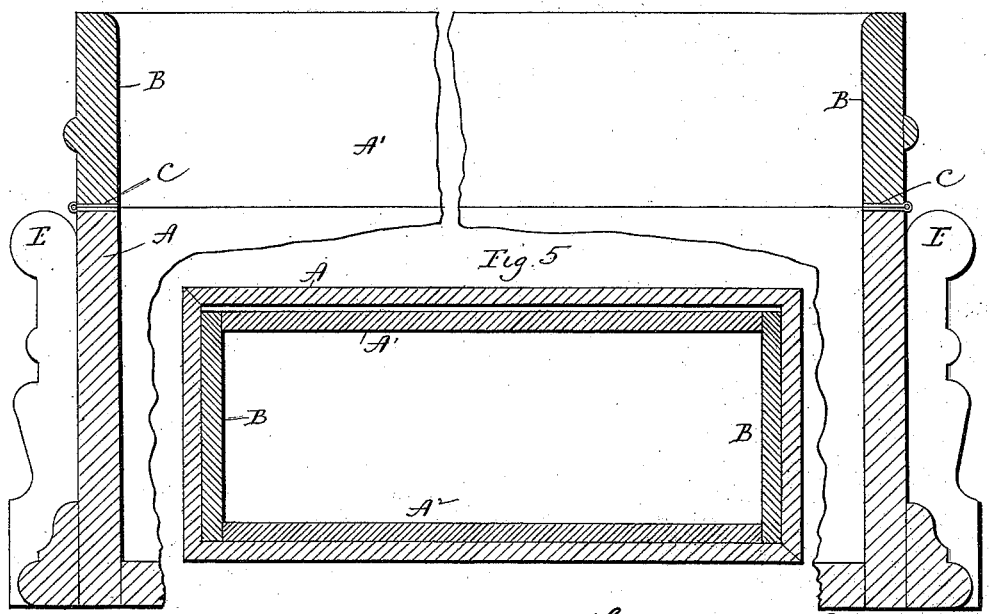

UNITED STATES PATENT OFFICE.

THOMAS H. LINAHAN, OF NEW HAVEN, CONNECTICUT.

CASKET.

SPECIFICATION forming part of Letters Patent No. 606,466, dated June 28, 1898.

Application filed April 22, 1898. Serial No. 678,536. (No model.)

*To all whom it may concern:*

Be it known that I, THOMAS H. LINAHAN, of New Haven, in the county of New Haven and State of Connecticut, have invented a new Improvement in Couch-Caskets; and I do hereby declare the following, when taken in connection with the accompanying drawings and the letters of reference marked thereon, to be a full, clear, and exact description of the same, and which said drawings constitute part of this specification, and represent, in—

Figure 1:
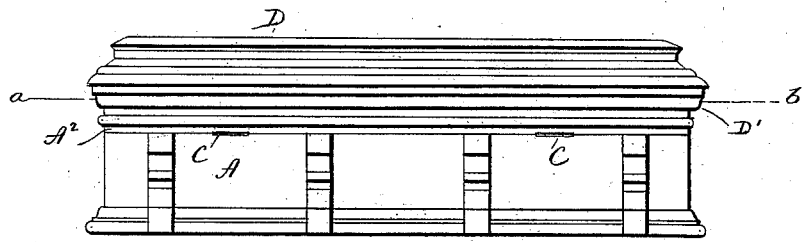
Figure 2:
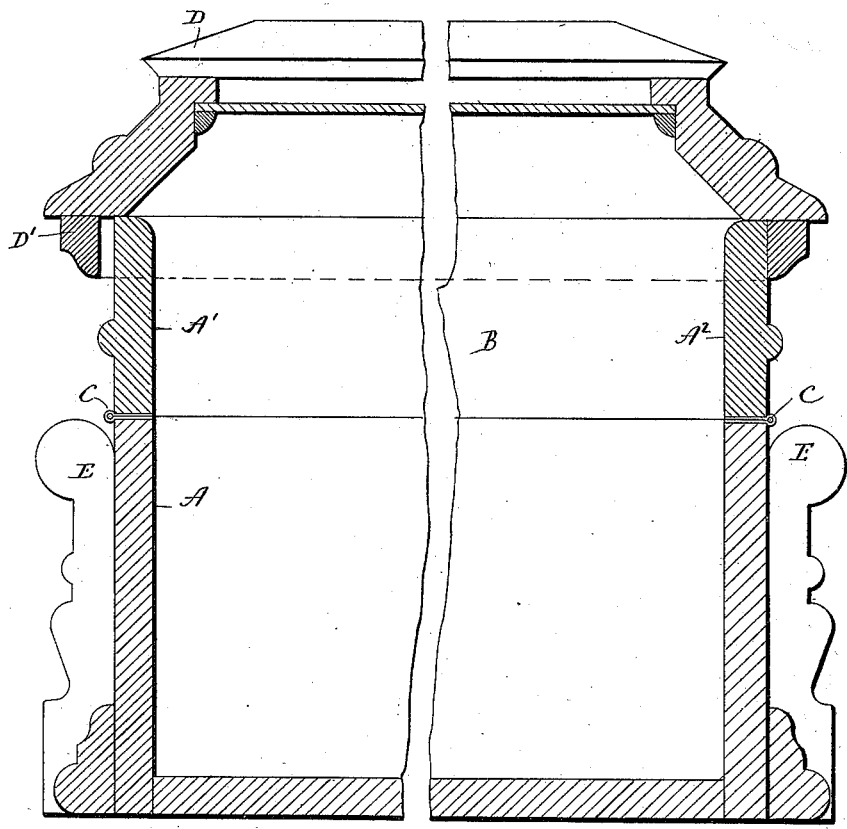

Figure 1, a view in side elevation of one form which a couch-casket constructed in accordance with my invention may assume; Fig. 2, an enlarged view of the casket in vertical transverse section and shown as closed; Fig. 3, a corresponding view shown as open; Fig. 4, a broken view of the casket in vertical longitudinal section with its end leaves shown in their closed position; Fig. 5, a view in horizontal section, on the scale of Fig. 1 and taken on the line $a\,b$ thereof, and showing how the flange of the cover shuts down over the front and end leaves and holds them in their closed positions.

My invention relates to an improvement in couch-caskets, the object being to produce at a comparatively low cost for manufacture a simple couch-casket constructed with particular reference to convenience of use and to presenting an elegant appearance.

With these ends in view my invention consists in a couch-casket having certain details of construction and combination of parts, as will be hereinafter described, and pointed out in the claims.

In carrying out my invention as herein shown I form the body A of the casket with side leaves A' and A², extending throughout its length, and with end leaves B B, extending across its ends, these leaves being secured to the upper edges of the side and end walls of the body of the casket so as to swing outward by means of hinges C, which may be of any approved construction and applied in any approved manner—as, for instance, as shown in Figs. 2 and 3. It is designed that the said leaves shall be adapted in width to form about one-third of the height of the entire casket-body of which they form a part. The cover D of the casket may be of any desired construction, and is rigidly secured to the back side leaf A², so that the said cover and the said leaf swing as one piece. When the casket is open, the front leaf A' and the back leaf A² and the end leaves B B swing outward and come to rest in horizontal positions, in which they are supported—as, for instance, by pilasters E, applied to the sides and ends of the body A of the casket. It is not necessary, however, to support the front and end leaves in horizontal positions, though that mode produces a desirable effect. It will be preferable, however, to have the back leaf A² supported in a horizontal position, as that mode of supporting the back leaf insures the supporting of the cover D in a vertical position, as shown in Fig. 3. To close the casket, the front leaf A' and the end leaves B B are lifted into vertical positions, after which the cover is swung into its closed position, when its depending front and end flanges D' will ride over the upper edges of the front and end leaves and lock them in their closed positions. The cover may then be secured in its closed position by a simple catch or lock connecting it with the front leaf, but not shown herein.

Of course my invention may be applied to caskets varying widely in size, construction, style, and ornamentation, and I would therefore have it understood that I do not limit myself to the exact construction shown, but hold myself at liberty to make such changes as fairly fall within the spirit and scope of my invention. I am aware, however, that a casket having a relatively low body portion which is raised to its full height by outwardly-swinging leaves or sections is old, and I do not claim such a construction broadly.

Having fully described my invention, what I claim as new, and desire to secure by Letters Patent, is—

1. A couch-casket having the upper edge of its body provided with front and back and end leaves arranged to swing outward, and provided with a cover which is rigidly secured to the back leaf and which is adapted to shut over the upper edges of the front and end leaves for holding them in their closed or upright positions.

2. A couch-casket having its body provided upon its upper edge with outwardly-swinging front and back and end leaves, and provided with a cover rigidly secured to its back leaf and adapted to shut over the upper edges of the front and end leaves for securing them in their closed positions, and the said body of the casket being provided with pilasters or ornaments arranged to support the leaves in their open positions, in which the casket is converted into a couch.

In testimony whereof I have signed this specification in the presence of two subscribing witnesses.

THOS. H. LINAHAN.

Witnesses:
GEORGE D. SEYMOUR,
FRED. C. EARLE.